May 16, 1967 H. H. HOLLY 3,319,285
MOLDING DEVICE
Filed July 6, 1965 6 Sheets-Sheet 6

United States Patent Office 3,319,285
Patented May 16, 1967

3,319,285
MOLDING DEVICE
Harry H. Holly, Olympia Fields, Ill., assignor to Holly-matic Corporation, a corporation of Illinois
Filed July 6, 1965, Ser. No. 469,381
8 Claims. (Cl. 17—32)

ABSTRACT OF THE DISCLOSURE

A device for molding articles of plastic material such as patties from ground meat, fish and the like including a hopper for retaining a mass of the material, an isolating apparatus for segregating a portion of the plastic material from the mass in the hopper, an apparatus for thereafter transferring a sufficient amount of this segregated portion into a shaping means such as a mold to fill the shaping means in which the transfer is accomplished by means including a yieldable pressure applying member that forces this segregated portion into the shaping means in an amount sufficient to fill it.

---

This invention relates to a device for molding articles of plastic material.

The device of this invention may be used for molding articles of plastic material generally but is particularly useful for molding edible materials such as ground meat to form shaped articles such as meat patties.

One of the features of this invention is to provide an improved device for molding articles of plastic material in which means are provided for segregating a portion of material from a large mass of material and transfer means for thereafter transferring this segregated portion into a shaping means.

Other features and advantages of the invention will be apparent from the following description of certain embodiments thereof taken in conjunction with the accompanying drawings. Of the drawings:

FIGURE 3 is a vertical sectional view taken substantially along line 3—3 of FIGURE 1.

In the embodiment of FIGURES 1-5 the molding device comprises a hopper 20 adapted to contain ground meat or a similar plastic material and having positioned therein a pair of rotatable drums 21 and 22. The drum 21 is adapted to be rotated in a counterclockwise direction, as viewed in FIGURE 4, while the drum 22 is rotated in a clockwise direction, as viewed in FIGURE 4.

Figure 4:
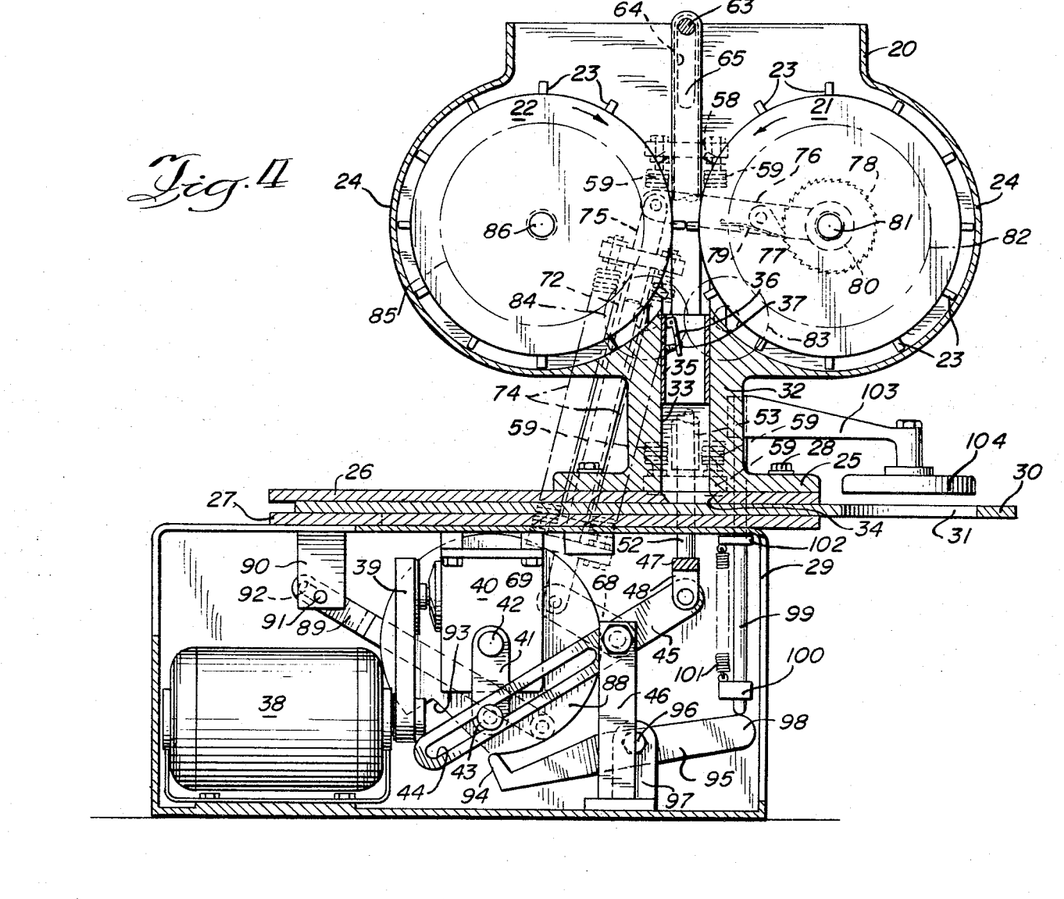
FIGURE 4 is a vertical sectional view taken substantially along line 4—4 of FIGURE 3.

Each drum 21 and 22 is provided with spaced rows, each substantially parallel to the axis of its drum, of radially extending feeder pins 23. The drums 21 and 22 are located within the hopper 20 and have parallel axes, and the hopper is cylindrically rounded on opposite sides, as indicated at 24, to accommodate the drums. Because of the above-described direction of rotation of the drums, the pins 23 at the top of the drum at any given time move toward the similarly moving pins at the top of the other drum.

The hopper 20 is provided with bottom flanges 25 bearing against a top plate 26 that is spaced from a parallel bottom plate 27. This assembly is bolted together as by bolts 28 and is mounted on a base 29 which contains the motor drive. Slidably held between the plates 26 and 27 is a mold plate 30 containing a mold opening 31 into which the plastic material, in this embodiment ground meat or other ground edible material, is forced to provide patties such as hamburger patties.

The bottom of the hopper 20 above the flanges 25 is provided with a relatively heavy portion 32 in which is located a vertical passageway 33 of rectangular horizontal cross section. As is shown in FIGURE 4, the top of this passageway communicates with the portion of the hopper 20 between the rotatable drums 21 and 22. The bottom of the passageway communicates with a forwardly sloped opening 34 in the top plate 26 which extends to the mold plate 30.

Figure 5:
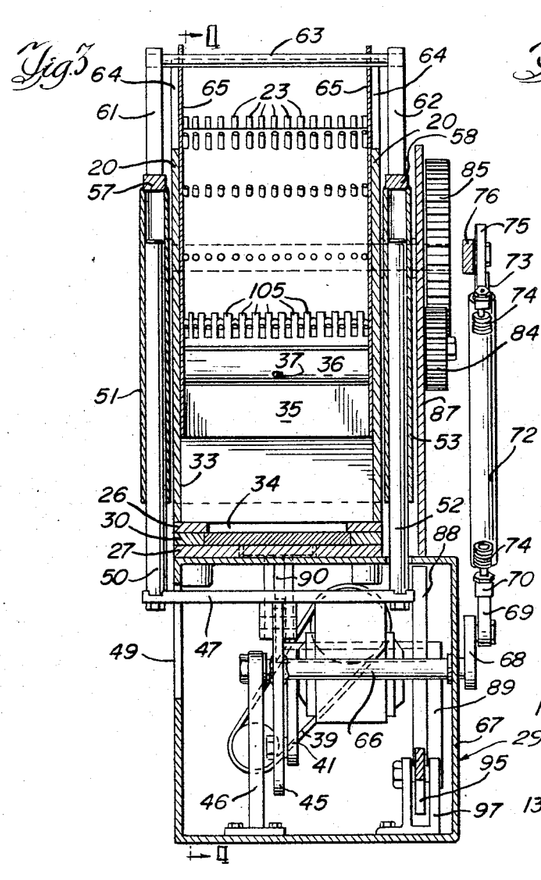
FIGURE 5 is a view similar to FIGURE 4 but showing the parts at a different portion of the operating cycle.

Mounted for vertical reciprocation within the passageway 33 is an isolating means 35 in the form of a metal shell open at the top and bottom, as shown in FIGURE 4. The top is provided with a hinged valve closure 36 hingedly connected to one side of the shell 35 at the top thereof so that the valve is moved to one side, as shown in FIGURE 4, on upward motion of the shell 35 and is moved to close the top of the shell, as shown in FIGURE 5, when the shell is moved downwardly. The valve 36 is provided with an adjustable stop 37 in the form of a screw in order to hold the valve spaced from the adjacent wall of the shell 35, even when the valve is in its most wide open position, as shown in FIGURE 4.

The base 29 contains an electric motor 38 at one side that drives a belt 39 which in turn drives a gear reducer 40. Extending from this gear reducer is a crank arm 41 which is rotated in a clockwise direction, as viewed in FIGURE 4, by the motor 38.

The arm 41 has one end rotatable with a gear reducer shaft 42 and the other end provided with a pin 43 that engages a longitudinal slot 44 in one end of a lever 45 that is rotatably mounted on a support bracket 46. The other end of the lever 45 is rotatably connected to an arm 47 by way of a pair of closely spaced brackets 48 located on opposite sides of the lever 45. The arm 47 is substantially horizontal and has its forward end extending through a slot 49 in the base 29 to a point beyond the front of the hopper 20 and its rear end positioned rearwardly of the rear of the hopper 20, all as shown most clearly in FIGURE 3.

Figure 1:
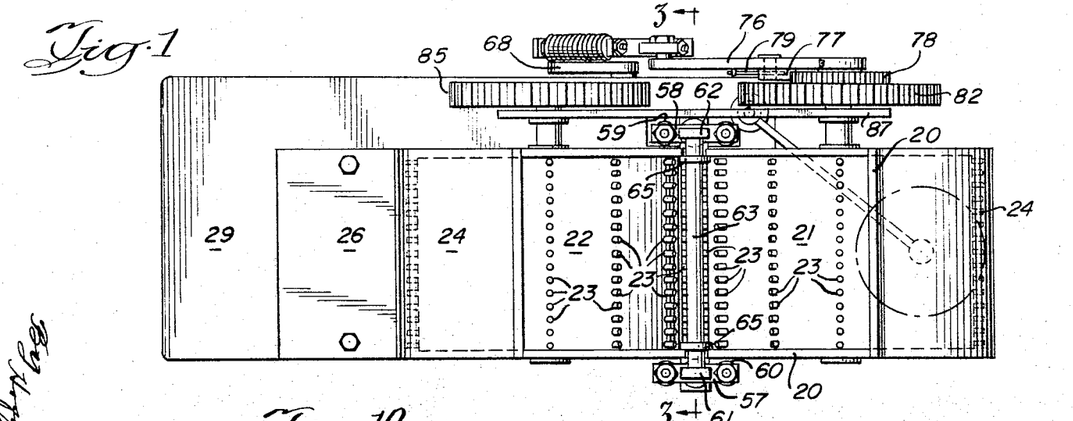
FIGURE 1 is a plan view of a first embodiment of the device of this invention.
Figure 2:
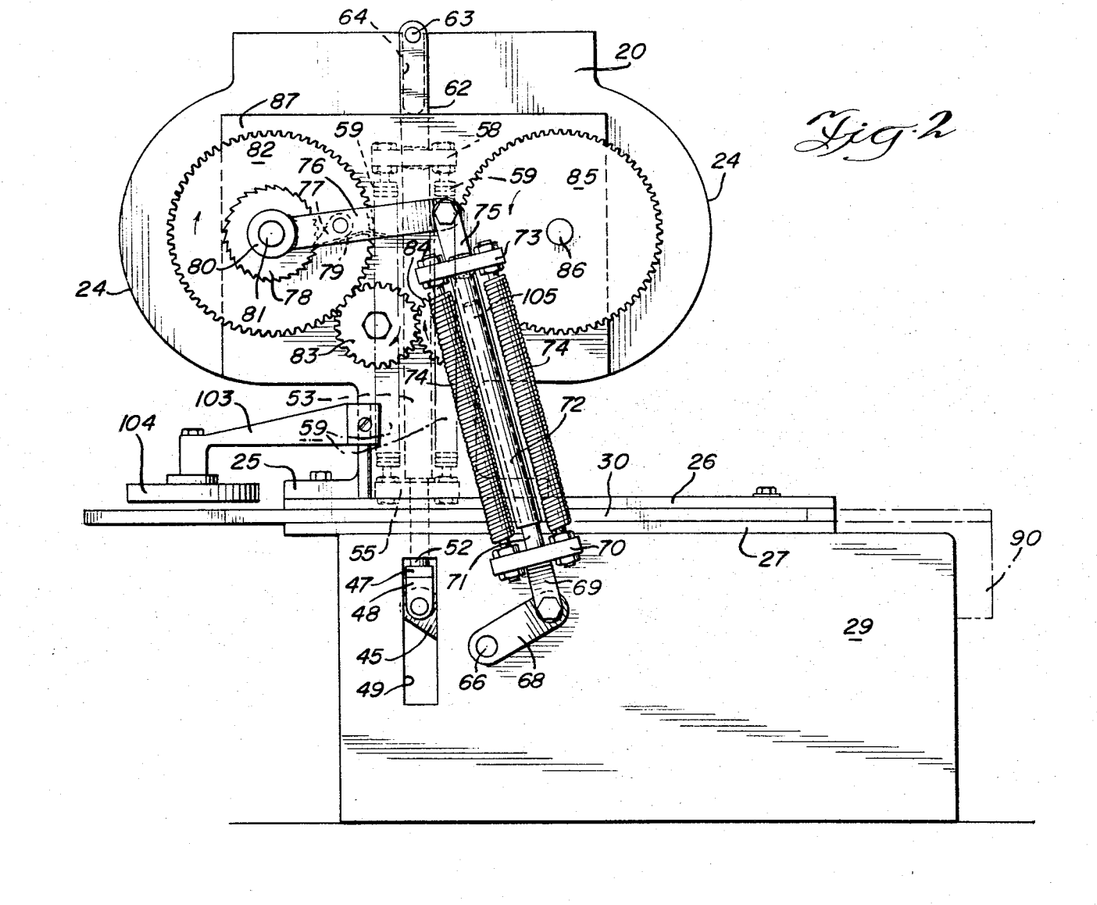
FIGURE 2 is a side elevational view of the apparatus showing the upper side of FIGURE 1.

The forward end of the arm 47 is provided with an upwardly extending vertical rod 50 that is telescopically received in a tube 51. The rear end of the arm 47 is similarly provided with a rod 52 and tube 53. The rod 50 is provided with a cross arm 54 below the bottom of the tube 51 as is shown in FIGURES 2 and 5. The other rod 52 is similarly provided with a cross arm 55 that is similarly located below the corresponding tube 56 (FIGURE 4). The top of the tube 51 is provided with a cross arm 57 similar to the cross arm 54. The top of the tube 56 is provided with a similar cross arm 58. Extending between the pair of cross arms 54 and 57 on opposite sides of the tube and rod assembly are a pair of tension springs 59. A pair of similar springs 60 are similarly located between the cross arms 55 and 58. The two pairs of springs serve to urge the tubes 51 and 56 downwardly on their rods 50 and 52.

Extending upwardly from each top cross arm 57 and 58 is a metal bar 61 and 62, respectively. These bars which extend vertically are connected by a horizontal cross bar 63. The hopper 20 is provided with vertical parallel slots 64 in order to provide for vertical movement of cross bar 63.

Extending downwardly from the cross bar 63 on either side of the hopper 20 and against the inner surface thereof are a pair of flat metal straps 65. The straps 65 are positioned against the inner surface of the sides of the hopper 20, as shown in FIGURE 3, and carry at their lower ends the shell 35 which is of rectangular cross section and which extends from side to side of the hopper 20.

The oscillatable lever 45 is attached to a pivot shaft 66 which oscillates with the lever with a forward end of this shaft 66 being held by the upper end of the bracket 46 and the rear end of the shaft held by the rear wall 67 of the base housing 29. With this arrangement as the lever 45 is oscillated up and down, as viewed in FIGURE 4, by rotation of the gear reducer crank arm 41, the pivot shaft 67 is oscillated along with it.

As is shown in FIGURES 2 and 3, the rear end of the shaft 66 extends beyond the rear wall 67 and has mounted thereon a crank arm 68. The outer or free end of this arm 68 has hingedly mounted thereon one end of a metal bracket 69 which is attached to a cross arm 70. Extending upwardly from the cross arm 70 is a rod 71 that is telescopically received within a tube 72. The upper end of this tube is attached to another cross arm 73 similar to the arm 70. Extending between the arms 70 and 73 and on opposite sides of the tube 72 are a pair of tension springs 74 that continually urge the cross arms 70 and 73 toward each other and thus urge the rod 71 and tube 72 into closer telescoped relationship.

Extending away from the upper cross arm 73 is a bracket 75 similar to the bracket 69 and hingedly attached to the upper end of this bracket 75 is an arm 76 that carries on its inner surface that is adjacent the hopper 20 a ratchet pawl 77 that is urged into engagement with a ratchet wheel 78 by a spring 79 that is attached to the arm 76. The arm 76 is attached at the end that is opposite the bracket 75 to a collar 80 rotatably mounted on the drum shaft 81 for the feeder drum 21. The ratchet wheel 78 is attached to the drum shaft 81 for movement therewith but the collar 80 is movable on the shaft.

Also attached to the ratchet wheel 78 is a gear wheel 82 of large size which is part of a gear train. In this gear train the relatively large gear wheel 82 engages a smaller gear wheel 83 which in turn engages a second small gear wheel 84 of substantially the same size which in turn engages another large gear wheel 85 which is mounted for rotation with the drum shaft 86 for the other feeder drum 22. The gear train 82–85 is mounted rearwardly of a supporting metal plate 87 that is supported by the base flanges 25. As is shown most clearly in FIGURES 2 and 3, the drum shafts 81 and 86 extend through this plate for mounting the operating gears 82 and 85 while the telescoped rod 52 and tube 53, the cross arms 55 and 58 and parallel springs 59 are located between this plate 87 and the hopper 20.

As is shown in FIGURES 4 and 5, the gear reducer shaft 42 which has attached to one end thereof the crank arm 41 has mounted on the other end a circular cam plate 88. This cam plate which is rotated by the rotation of the shaft 42 serves to reciprocate the mold plate 30 back and forth between the two extreme positions illustrated in FIGURES 4 and 5. This is accomplished by attaching one end of an operating arm 89 to the cam plate 88 and the other end to a bracket 90 mounted on the bottom of the mold plate 30 at the end opposite the mold opening 31. The bottom end of the bracket 90 is provided with a cross pin 91 which engages an elongated slot 92 in the arm 89 in order that there will be a delayed initiation of movement of the mold plate 30 at each end of its travel. This delay is to give time for the mold opening to be filled when it is beneath the mold filling opening 54 and to permit the patty to be removed from the opening 31 when the mold plate is in the position of FIGURE 4.

The cam plate 88 also contains a notch 93 in its periphery and this periphery is engaged by an extended end 94 of an oscillatable lever 95 mounted for oscillation on a pin 96 held by a bracket 97.

The opposite end 98 of the lever 95 engages the bottom of a vertically extending rod 99 that extends through the top of the base 29. This rod 99 is vertically slidable and has its lower end slidable held by a bracket 100 mounted on the base 29 immediately above the topmost position of the end 98 of the lever 95. The rod 99 is vertically reciprocable in bearing means formed by the base 29 and the bracket 100. The rod 99 is continually urged downwardly by means of a tension spring 101 attached to the bracket 100 and to a second bracket 102 that is attached to the rod 99 immediately beneath the top of the base 29.

The top of the rod 99 beyond the top of the base 29 has attached thereto an outwardly extending knockout bracket 103 carrying on its outer end a knockout ring 104. The ring is so positioned, as shown in FIGURE 4, that it is immediately above the mold opening 31 when the mold plate 30 is in its most forward position.

Structures similar to the slidable mold plate 30, rotatable cam plate 88 and knockout arrangement for removing patties from the mold opening 31 are shown in various of my prior patents of which Patents 2,564,064 and 2,787,808 are exemplary.

The operation of the above-described first embodiment shown in FIGURES 1–5 is as follows:

The motor 38 through the drive belt 39 and gear reducer 40 oscillates the lever 45 in a vertical plane. The oscillation of the lever 45 reciprocates the cross arm 47 that is mounted on the end of the lever opposite the gear reducer 40 and this arm 47 reciprocates the telescoped rods 50 and 52. These rods when they are moved upwardly by the arm 47 raise the tubes 51 and 53 and the cross arms 57 and 58 attached to the tops of these tubes. These in turn raise the vertical bars 61 and 62 to raise the cross bar 63 to the tops of the hopper slots 64 as shown in FIGURE 4. Then, when the cross arm 47 is moved downwardly toward its lowest position as shown in FIGURE 5 by the upward movement of the gear reducer crank arm 41 to the position shown in FIGURE 5, this lowering of the cross arm 55 exerts tension on the springs 59 which in turn pulls the cross arm 63 and attached metal straps 65 downwardly. As the lower ends of these metal straps carry the shell 35 with its top hinged valve 36 this lowering also forces the shell down with the meat or other plastic material within the shell 35 trapped by the closed valve 36, as shown in FIGURE 5. Thus, oscillation of the lever 45 in a vertical plane causes raising and lowering of the shell 35 with the shell being raised when the lever 45 moves from the position shown in FIGURE 5 to the position shown in FIGURE 4 and being lowered when moved in the opposite position.

At the same time, the oscillation of lever 45 also oscillates the pivot shaft 66, thereby oscillating the crank arm 68 and the telescoped rod 71 telescopically received within the tube 72. Upward movement of the crank arm 68 and attached parts toward an upwardly extending vertical position shown in FIGURE 5 causes the inner end 105 of the rod 71 (FIGURE 2) to engage the extreme upper end of the inside of the tube 72 to raise the ratchet arm 76 to its uppermost position, also as shown in FIGURE 5.

Then, when the crank arm 68 is oscillated toward its downwardly extending position the downward pull on the lower cross arm 70 exerts a pull on the springs 74 which in turn pulles the upper cross arm 73 and the ratchet arm 76 downwardly. This downward movement of the arm 76 causes the pawl 77 to engage a tooth on the ratchet wheel 78, as shown in FIGURE 2, and turns the ratchet wheel one increment which is equivalent to the angular movement of the arm 76. This turning of the ratchet wheel 78 similarly turns the feeder drum shaft 81 and the first large gear 82 of the gear train. This gear train 82–85 causes the feeder drums 21 and 22 to move in similar increments to the increments of the ratchet arm 76 with the tops of the peripheries of these drums moving toward each other. Thus, as shown in FIGURES 4 and 5, these increments will cause movement of the one feeder drum 21 in a counterclockwise direction and the other drum 22 in a clockwise direction. This turning of the drums causes the protruding pins 23 to feed meat, for example, down between the drums and toward the oscillating shell 35.

As can be seen by the above description and the illustrated arrangement of parts, the device is so constructed that as the shell 35 is moved upwardly from the bottom of its vertical passageway 33, or from the position shown in FIGURE 5 toward the position shown in FIGURE 4, the moving drums 21 and 22 and feeder pins 23 are moving meat down toward the rising shell. This combined motion of the feeder pins and the shell in opposite directions causes the ground meat to be forced into the shell displacing the valve 36 downwardly, as shown at 54, so that the entire passageway 33 including the shell 35 is filled with meat at substantially all times.

Then, on reverse movement of the lever 45 from the position shown in FIGURE 4 to the position shown in FIGURE 5, the shell 35 is pulled downwardly with the result that the valve 36 is closed and the entrapped meat is forced through the feeder opening 34 into the mold opening 31 which at this time is beneath the feeder opening 34. This timing is brought about by the point of connection of the mold plate operating arm 89 to the rotatable cam 88.

As can be seen, the force pulling the meat entrapping shell 35 downwardly to force the meat into the mold opening 31 is the yieldable spring pull exerted by the springs 59. This arrangement is provided so that excessive pressure will not be brought to bear on the meat when the mold opening 31 is filled. This avoids excessive working of the meat which tends to reduce its quality.

At the same time the shell 35 is being pulled downwardly from the position shown in FIGURE 4 to the position shown in FIGURE 5, the feeder drums 21 and 22 are not moving as the rotatable arm 76 is being raised to its most elevated position, shown in FIGURE 5, preparatory to another down reciprocation of this arm and another feeding movement of the drums 21 and 22. Thus, when the shell 35 is being filled with meat by upward movement of the shell the meat is being fed toward the rising shell by the moving drums 21 and 22. However, when the filled shell is pulled downwardly to force meat into the mold opening 31 the drums are not moved but the ratchet is being raised again preparatory to a subsequent movement of the drums.

In order to prevent excessive accumulation of meat between the drums 21 and 22 and the rounded portions 24 of the hopper 20, there are provided on each side of the top of the feed passage 33 upwardly extending fingers 105 that are spaced apart a distance equivalent to the horizontal spacing of the pins 23 with each finger having a curved upper surface closely adjacent the outer surface of its drum. The fingers 105 therefore act as combs between which the feeder pins 23 move.

The device of this invention provides storage, as by the hopper 20, for a large mass of moldable material which in the illustrated embodiment is ground meat, fish and the like. The device also includes a shaping means embodied in the mold plate 30 with the mold openings 31 adapted to receive plastic material from the hopper through an exit opening shown at 34. A very important feature of the device is the isolating means illustrated by the shell 35 for segregating a portion of meat or other plastic material from the large quantity held in the hopper 20, in combination with transfer means embodied in the elements which result in reciprocation of the shell 35 for thereafter transferring this segregated portion of plastic material through the opening into the shaping means.

The advantages of this structure are that the isolating means takes a small portion of the large mass of material and exerts pressure on this portion only to force it into the mold. A mass of material that is fed toward the isolating means by the drums 21 and 22 and pins 23 is not subjected to excessive pressure. In fact, the large drums and the pins are provided so that the meat or other plastic material will be gently urged in the mass toward the isolating means. This permits avoiding excessive working which with edible material such as ground meat tends to reduce the quality by squeezing out juices and otherwise degrading the material. In addition, the large mass of material provides a large source of supply which is important because the molding device of this invention can be operated at very high speed. It thereby reduces the labor of prior devices in which the hopper had to be filled frequently.

As can be seen in FIGURES 4 and 5, the adjacent peripheries of the drums or wheels 21 and 22 at the point where the pins 23 are closest together, which is in this embodiment on a line between the centers of the shafts 78 and 86, is linearly aligned with the passageway 33 and the feed opening 34 leading to the mold opening 31. This means that once the meat or other plastic material is moved into position to be received within the rising shell 35 it is moved in a straight line into the mold opening without having to pass around corners. This also prevents excessive working of the meat or other plastic material and thereby prevents degrading it. As mentioned earlier, the vertical column formed by the passageway 33 is always filled with moldable material, so that the material is forced under constant pressure by the springs 59 into the mold opening 31 through the passageway opening 34. With the structure of this invention the downward pressure exerted by the springs 59 on the meat forced through the exit 34 into the mold opening 31 is maintained until the mold opening has been reciprocated from the position shown in FIGURE 5 toward the position shown in FIGURE 4, so that the mold opening 31 will be full of meat to produce a full weight patty.

As mentioned, rotation of the cam plate 88 causes reciprocation of the mold plate 30 by way of the operating arm 89. As the lever finger 94 travels on the periphery of the cam plate 88 it periodically drops into the notch 93 so that the spring 101 can lower sharply the knockout ring 104. The structure is so constructed that this occurs when the mold opening 31 is directly beneath the knockout ring 104. This lowering of the ring 104 moves the patty from the opening and the slot 92 in the operating arm 89 gives the cam 88 time to raise the rod 99 and lift the ring 104 from the opening 31. In the position shown in FIGURE 4 the finger 94 has just emerged from the cam notch 93 to lift the ring 104 from within the mold opening 31.

Figure 6:
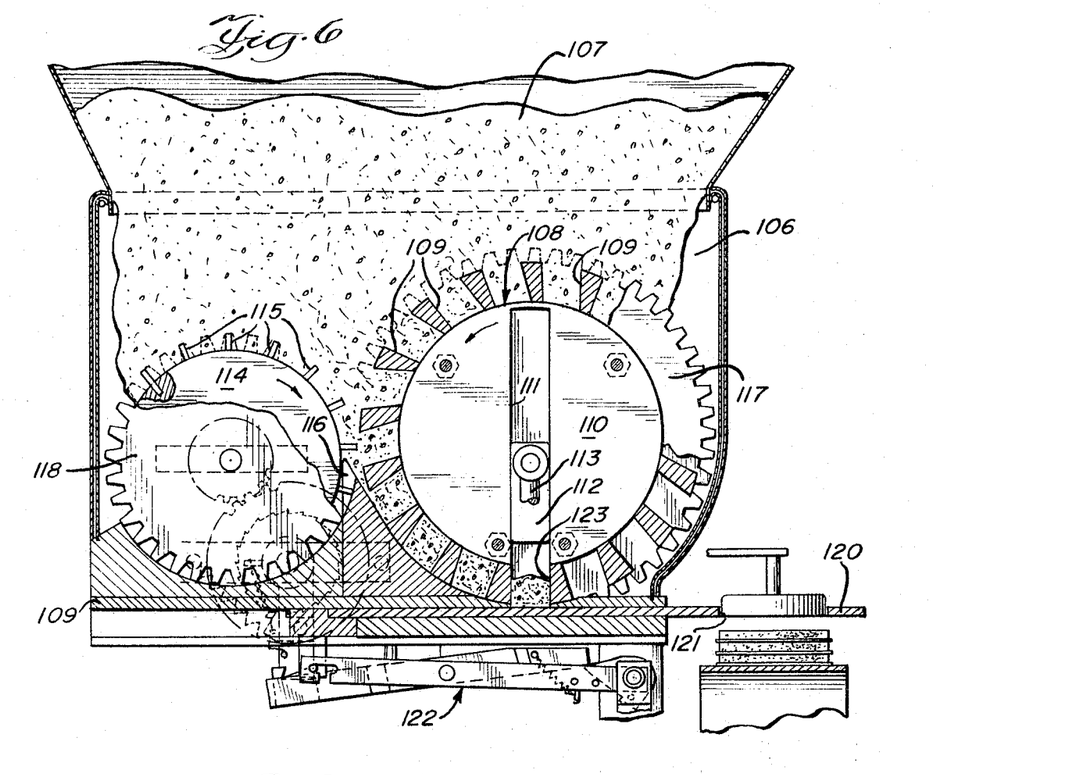
FIGURE 6 is a fragmentary view similar to FIGURE 4 but illustrating a second embodiment of the invention.

FIGURE 6 illustrates a second embodiment of the invention. Here also there is provided a hopper 106 for holding a large supply of the plastic material 107 such as ground meat. At the bottom of the hopper, at one side thereof, there is located a hollow drum 108 containing outwardly opening spaced pockets 109 adapted to receive the plastic material as shown. This hollow drum 108 is rotated on a fixed cylinder 110 which contains a vertical passageway 111 that communicates at its lower end with each of the pockets 109 in series as the drum 108 is rotated. Vertically movable within the passageway 111 is a piston 112 that is reciprocated in its passageway by apparatus including an operating rod 113.

In order to pull the plastic material into position to fill the series of pockets 109 there is located at one side of the drum 108 a rotatable cylinder 114 provided with radially extended pins 115 arranged in rows similar to the pins 23 in the first embodiment. These pins 115 also pass between comb fingers 116 similar to the fingers 105 of the first embodiment. The drum 108 and the cylinder 114 are rotated with the top peripheral portions moving toward each other by meshing gears 117 and 118 mounted on the drum 108 and cylinder 114, respectively.

The bottom of the hopper 106 is mounted on a base plate 109 which is located above a reciprocable mold plate 120 similar to the mold plate 30 and also containing the mold opening 121. The mold plate 120 is reciprocated and the drum 108 and cylinder 114 are rotated in generally the same manner as provided in the first embodiment by operating apparatus indicated generally at 122 in FIGURE 6. As this apparatus forms no part of the present invention, it is not shown in detail.

This operating apparatus also serves to reciprocate the piston 112 in timed relationship to the reciprocable mold plate 120. Thus, as the mold plate 120 is retracted to a position where the mold opening 121 is directly beneath a filled pocket 123, which in turn is directly beneath the passageway 111 in which the cylinder 112 reciprocates, the cylinder is pulled down during a pause in the movement of the drum 109 to force the meat from the pocket 123 into the mold opening 121. Then, the piston 112 is retracted to the position shown in FIGURE 6 and the drum 108 moved another increment to bring the next pocket 109 into alignment with the bottom of the passageway 112. Thus, the embodiment of FIGURE 6 is quite similar to the first embodiment of FIGURES 1–5 in that means are provided for gently forcing the plastic material into a segregating means (the pockets 109) to segregate a portion of the large mass 107 of material and then, during a pause in the feeder means 108, the segregated portion 123 is forced by the reciprocable forcing means, here shown as the piston 112, into the mold opening 121.

Figure 7:
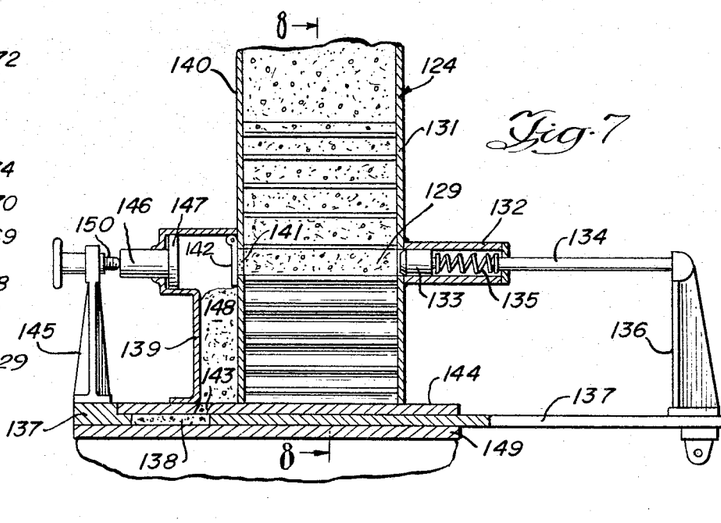
FIGURE 7 is a vertical sectional view showing a third embodiment of the invention.
Figure 8:
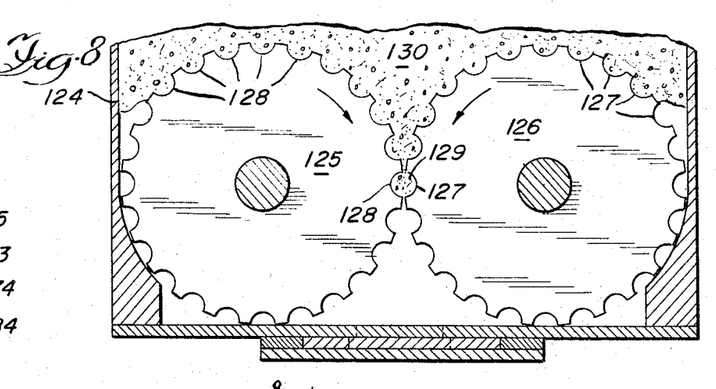
FIGURE 8 is a vertical sectional view taken substantially along line 8—8 of FIGURE 7.

In the embodiment of FIGURES 7 and 8 there is provided a hopper 124 in the bottom of which are rotatably mounted a pair of adjacent drums 125 and 126. These drums are rotated so that the tops of their peripheries move toward each other and each drum is provided with a series of semi-cylindrical grooves 127 and 128 with a groove on one drum cooperating with a groove on another drum at the closest spacing of the drums, as shown in FIGURE 8, to form in succession a series of cylinder 129 of moldable material from the mass of material 130 in the hopper.

Extending from one wall 131 of the hopper 124 opposite a cylinder of plastic material, such as meat 129, is a hollow metal cylindrical extension 132. This extension contains a ram 133 that is connected to an operating rod 134 by a compression spring 135. This rod is mounted on a bracket 136 which in turn is mounted on the end of a slidable mold plate 137 at the end opposite the mold opening 138.

The ram 133 communicates with one end of a cylindrical pocket 129 during a pause in the rotational movement of the drums 125 and 126. The other end of the pocket 129, as shown in FIGURE 7, communicates with a vertical passage 139 located adjacent the opposite wall 140 of the hopper 124. This communication is provided by an opening 141 in this wall that is normally closed by a valve 142.

At the bottom of the passageway 139 there is provided a feeder opening 143 in the base plate 144 that is adapted to communicate with the mold opening 138. Mounted on the reciprocable mold plate 137 adjacent the mold opening 138 is an upwardly extending bracket. This bracket carries at its upper end a plunger 146 extending into the upper end of the passageway 139. The inner end of this plunger within the passageway 139 carries a pusher plate 147.

With this construction, the drums 125 and 126 are rotated in increments to bring successive pairs of grooves 127 and 128 in alignment to form successive cylinders of meat or other moldable material 129. When the mold plate 137 is reciprocated to the left, as shown in FIGURE 7, the spring 135 is compressed to apply pressure to the ram 133 which forces the meat 129 into the interior 148 of the passageway 139 by displacing the check valve 142. This movement to the left also moves the mold opening 138 with a contained patty from between the base plates 144 and 149 so that the patty can be ejected in the manner previously described. Then, when the mold plate 137 is reciprocated to the right, the bracket 136 disengages the end of the operating rod 134 and the adjusting screw 150 at the top of the bracket 145 contacts the plunger 146 as shown in FIGURE 7 so that further movement to the right pushes the plate 147 to the right into the passageway 139 to force the mass of meat in the interior 148 through the exit opening 143 into the mold opening 148.

Thus, again in this embodiment, there is provided the segregating means made up of the cooperating grooves 127 and 128 to segregate at low pressure plastic material from a large mass of plastic material 130 together with means for forcing this segregated portion under much greater pressure into the mold embodied in the mold opening 138.

Figure 9:
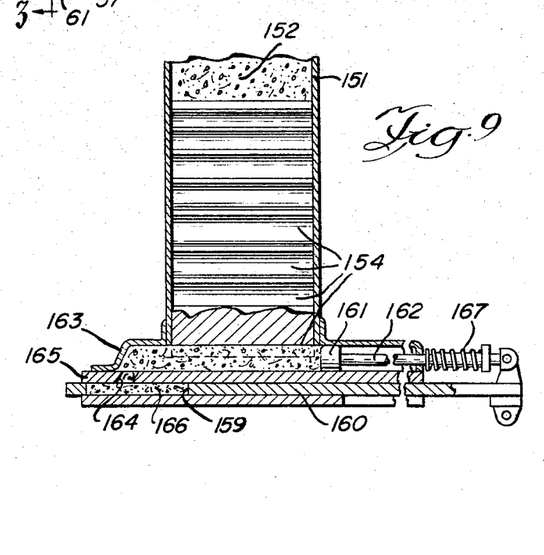
FIGURES 9 and 10 are similar to FIGURES 7 and 8, respectively, illustrating a fourth embodiment of the invention.
Figure 10:
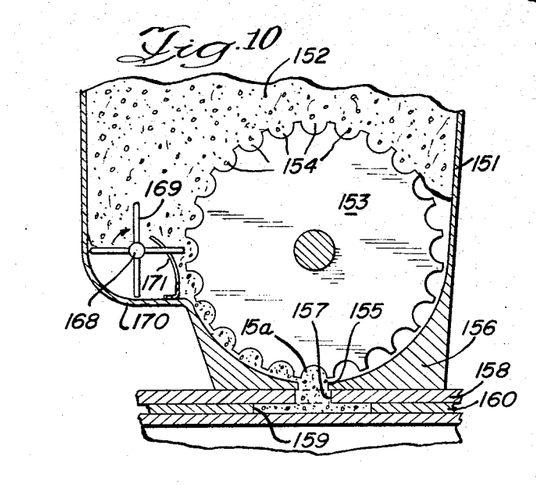

In the fourth embodiment of FIGURES 9 and 10, there is also provided a hopper 151 for a large mass of plastic material 152 such as ground meat and a rotatable drum 153 at the bottom of the hopper. This drum is also provided with a series of adjacent pockets 154 in its periphery with the pockets picking up meat from the mass 152 and with each pocket in turn cooperating with a feed opening 155 in the base 156 of the drum. This opening 155 communicates with a similar opening 157 in a base plate 158 to feed the plastic material into the mold opening 159 of a reciprocable mold plate 160.

As is shown in FIGURE 9, each lowermost pocket 154 during the pause in the movement of the drum 153 is adapted to receive a plunger 161 mounted on the end of an operating rod 162. During a pause in the movement of the drum 153 and of the mold plate 160 the plunger 161 is forced forwardly so that meat from the lowermost pocket 154 is forced through an extension 163 of the hopper 151 and down through a feed opening 164 in a base plate 165 into the mold opening 159. The mold plate 160 is then moved to the left to place the mold opening in the external position for ejecting the contained patty 166 and at the same time the plunger 161 is retracted. Mechanism for accomplishing this movement of the mold plate and plunger in opposite directions is disclosed in the fifth embodiment of FIGURE 11. As soon as the plunger 161 has been completely withdrawn from even the lowermost pocket 154 the drum 153 is moved another increment, the mold opening is moved back to the position shown in FIGURES 9 and 10, and the plunger 161 is again inserted into the lowermost pocket to again fill the mold opening 166. Spring 167 surrounding the rod 162 is provided so that the pressure on the meat will not be excessive in the manner previously described in connection with the embodiment of FIGURE 1.

As can be seen, in this fourth embodiment means are provided for segregating at low pressure a portion of plastic material from a large mass of material and then forcing this segregated portion into a shaping means embodied in the mold opening at greatly increased pressure.

As shown in FIGURE 10, the successive pockets 154 are kept filled with meat or similar plastic material by a rotatable member 168 having radially extending spaced fingers 169 located in an extension chamber 170 in the hopper. These fingers, during rotation, force material 152 toward the periphery and therefore the pockets of the drum 153. Spaced comb fingers 171 similar to the fingers 105 of the first embodiment are provided to force the thusly moved material toward the drum 153.

Figure 11:
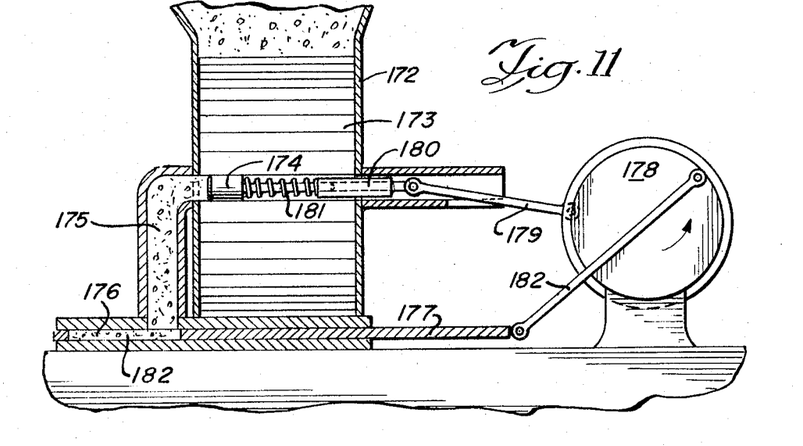
FIGURE 11 is a view similar to FIGURE 7 and illustrating a fifth embodiment of the invention.

In the fifth embodiment of FIGURE 11 the hopper 172 is provided with a pocketed drum 173 similar to the drum 153 of FIGURES 9 and 10. Here the plunger 174 is adapted to enter a side pocket during a pause in the rotation of the drum to force the material down a vertical passageway 175 into a mold opening 176 in the reciprocable mold plate 177. The plunger 174 and the mold plate 177 are moved in opposite directions by a rotatable wheel 178 having a drive rod 179 connected at one end to the wheel and at the other end to a piston 180 which applies pressure on the plunger 174 by way of a compression spring 181. Also driven by the wheel 178 is a second drive rod 182 having one end connected to the drum 178 at a point slightly less than 90° from the point of connection of the rod 179 and the other end connected to the end of the mold plate 177 opposite the mold opening 176. With this construction, as the drum 178 is rotated during a pause in the movement of the drum 173 the plunger 174 enters the side groove of the drum 173 and forces by spring pressure 181 material from the groove into the passageway 175 and from there into the mold opening 176. Then the plunger 174 is retracted by continued rotation of the drum 178 and the mold plate 177 is moved out of communication with the passageway 175 and externally of the device for removal of the contained patty 182.

In each of the embodiments there is thus provided segregating means as described and forcing means for forcing the segregated portion into a mold.

Having described my invention as related to the embodiments shown in the accompanying drawings, it is my intention that the invention be not limited by any of the details of description, unless otherwise specified, but rather be construed broadly within its spirit and scope as set out in the accompanying claims.

I claim:

1. A device for molding articles of plastic material, comprising: a hopper for a mass of plastic material having an exit opening; shaping means adapted to communicate with said exit opening to receive plastic material therefrom; means in said hopper movably urging said material toward said exit opening comprising a pair of rotatable wheels having adjacent but spaced peripheries provided with outwardly extending pins, the pins on one wheel cooperating with those of the other to provide said urging, said adjacent peripheries being spaced from said exit opening; isolating means comprising a shell reciprocable in a path away from said exit opening toward said adjacent peripheries for entrapping a portion of said urged material in the shell and then toward said exit opening for forcing said portion through the exit opening into the shaping means; means for thusly rotating said wheels; and means for thusly reciprocating said shell.

2. The device of claim 1 wherein said adjacent peripheries, said path of reciprocation and said exit opening are substantially linearly aligned to prevent excessive working of said material while moving it from said hopper into said shaping means.

3. A device for molding articles of plastic material, comprising: a hopper for a mass of plastic material having an exit opening; shaping means adapted to communicate with said exit opening to receive plastic material therefrom; means in said hopper movably urging said material toward said exit opening comprising a pair of rotatable wheels having adjacent but spaced peripheries provided with outwardly extending spaced means, the means on one wheel cooperating with those of the other to provide said urging; isolating means reciprocable in a path between said adjacent peripheries and said exit opening to engage said mass and segregate a portion thereof and to force said portion through said opening into said shaping means; and means for thusly moving said isolating means.

4. A device for molding articles of plastic material, comprising: a hopper for a mass of plastic material having an exit opening; shaping means having a shaping opening adapted to communicate with said exit opening to receive plastic material therefrom; isolating means for segregating a portion of material from said mass that is larger than said shaping opening; and transfer means for thereafter transferring a sufficient amount of said segregated portion through said exit opening into said shaping means opennig to fill said shaping means opening, said transfer means comprising yieldable pressure applying means in addition to said isolating means and acting on said segregated portion for forcing said segregated portion through said exit opening into said shaping means without exerting excessive pressure on said segregated portion.

5. The device of claim 4 wherein means are provided for terminating the communication between said shaping means and exit opening while continuing said pressuure of the yieldable pressure applying transfer means.

6. The device of claim 5 wherein said shaping means communicates periodically with said exit opening, and said isolating means periodically segregates a portion of material from said mass of plastic material.

7. A device for molding articles of plastic material, comprising: a hopper for a mass of plastic material having an exit opening; shaping means adapted to communicate with said exit opening to receive plastic material therefrom; means in said hopper movably urging said material toward said exit opening comprising a pair of rotatable wheels having adjacent but spaced peripheries provided with outwardly extending pins, the pins on one wheel cooperating with those of the other to provide said urging, said adjacent peripheries being spaced from said exit opening; isolating means comprising a shell reciprocable in a path away from said exit opening toward said adjacent peripheries for entrapping a portion of said urged material in the shell and then toward said exit opening for forcing said portion through the exit opening into the shaping means; means for thusly rotating said wheels; means for thusly reciprocating said shell; and means for terminating the communication between said exit opening and said shaping means prior to reciprocating said shell back toward said adjacent peripheries.

8. A device for molding articles of plastic material, comprising: a hopper for a mass of plastic material having an exit opening; shaping means having a shaping opening adapted to communicate with said exit opening to receive plastic material therefrom; isolating means for segregating a portion of material from said mass that is larger than said shaping opening; and transfer means for thereafter transferring a sufficient amount of said segregated portion through said exit opening into said shaping means opening to fill said shaping means opening, said transfer means comprising yieldable pressure applying means for forcing said segregated portion through said exit opening into said shaping means without exerting excessive pressure on said segregated portion.

References Cited by the Examiner

UNITED STATES PATENTS

| 509,647 | 11/1893 | Beardsley | 222—355 X |
|---|---|---|---|
| 715,949 | 12/1902 | Biberfeld | 17—33 |
| 2,048,124 | 7/1936 | Hume | 222—355 X |
| 2,607,462 | 8/1952 | Lee | 222—361 X |
| 2,702,405 | 2/1955 | Garfunkel | 17—32 |
| 3,241,178 | 3/1966 | Bridge | 17—32 |
| 3,256,557 | 6/1966 | Blake | 17—32 |

FOREIGN PATENTS 1,325,528  3/1963  France.

LUCIE H. LAUDENSLAGER, *Primary Examiner.*